Jan. 2, 1940.   G. J. LANE   2,185,690
INSTRUMENT FOR MEASURING LIGHT REFLECTIVITY
Filed June 30, 1938   3 Sheets-Sheet 1

INVENTOR
George J. Lane
BY
Cooper, Kerr & Dunham
ATTORNEYS

Jan. 2, 1940.  G. J. LANE  2,185,690
INSTRUMENT FOR MEASURING LIGHT REFLECTIVITY
Filed June 30, 1938  3 Sheets-Sheet 2

INVENTOR
George J. Lane
BY
Cooper, Kerr & Dunham
ATTORNEYS

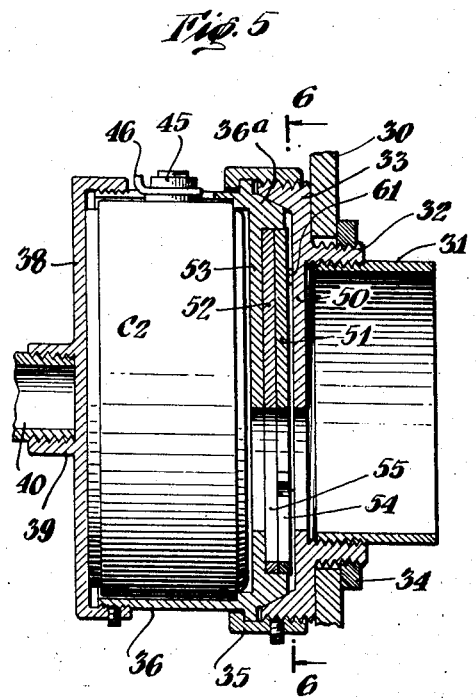
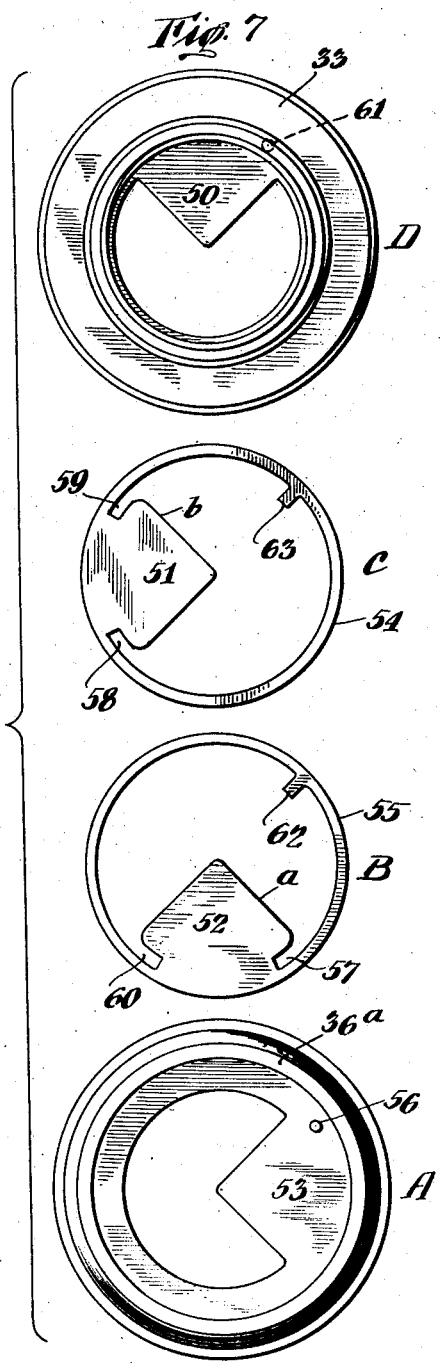
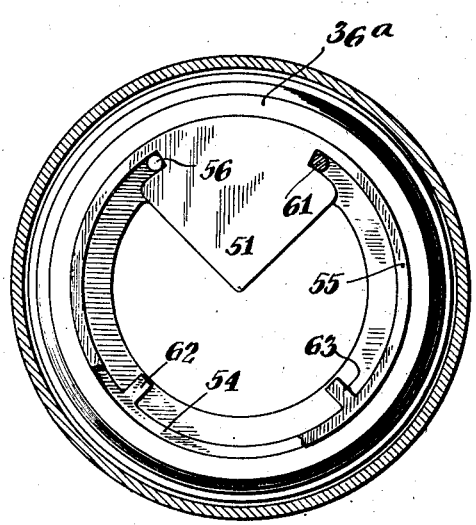

Patented Jan. 2, 1940

2,185,690

UNITED STATES PATENT OFFICE 2,185,690

INSTRUMENT FOR MEASURING LIGHT REFLECTIVITY

George J. Lane, Metuchen, N. J., assignor to Edgar Brothers Company, Metuchen, N. J., a corporation of New Jersey Application June 30, 1938, Serial No. 216,773

4 Claims. (Cl. 88—14)

In science and industry it is often desirable to compare the light-reflective powers of various surfaces, or to measure their reflective powers with reference to a suitable standard, or to compare or measure the intensities of light emitted by different sources, and a number of instruments for such comparisons and measurements have been proposed with varying success, some of them being of doubtful accuracy, others too costly or too complicated in operation to attain wide use. The present invention relates to instruments for the same purposes, and one of its important objects is to provide an accurate device which can be used successfully by persons who lack the high degree of skill usually required for the manipulation of scientific instruments. Another object is to provide an apparatus of simple construction which can be manufactured and sold at relatively low cost, thus bringing it within the reach of many who now find other instruments of perhaps comparable accuracy too expensive. A further object is to provide an instrument in which the surfaces to be compared, say one a standard and one a surface of unknown reflectivity, are exposed simultaneously to the light and in which the surfaces may be exchanged in position of exposure as a check to determine whether the intensity of the incident light is the same on the two specimens and to eliminate or decrease the effect of the observer's personal equation in reading the graduations by which the reflectivity of the surfaces is indicated. To these and other ends the invention comprises the novel features and combinations of parts hereinafter described.

The invention can be embodied in various forms, and of these I have selected for specific illustration herein the one which is believed to be the most effective. In this form I provide what may be conveniently termed a light-equalizing chamber, with an inner surface which is of light diffusing character and white in color. This surface of the chamber is preferably spherical in form, and has a matte finish on which is a matte coating of a suitable white pigment, the one so far found most suitable being pure freshly made magnesium oxide in a silicate vehicle. Such pigment is easily prepared by burning metallic magnesium and collecting the oxide on a polished metallic surface. On one side the chamber is provided with suitable openings, say two in number, through which the reflecting specimens are exposed to the interior of the chamber, and the chamber is also provided with two or more windows, symmetrically arranged with respect to the exposure openings, through which the interior can be illuminated. Opposite the exposure openings I provide two light-sensitive cells to receive light reflected from the respective surfaces exposed at such openings, with screening means to prevent light reflected from one surface reaching the cell which is individual to the other surface. Between each reflecting surface and its light-sensitive cell is an adjustable shutter by which the quantity or amount of light received by the cell can be varied by altering the cross sectional area of the reflected beam. The electromotive forces and currents generated in the cells are impressed on a suitable electrically actuated indicating instrument, say a sensitive galvanometer, the connection of the cells to the galvanometer being such that the two currents and voltages oppose each other, thus making the galvanometer read zero when the two cells are equally affected by the light received. The adjusting mechanism for at least one of the shutters is equipped with a graduated dial by which the setting of the shutter can be read.

The embodiment outlined above is illustrated in the accompanying drawings, in which:

Fig. 1 is a front view of the instrument, showing the shutter dials and the galvanometer, one of the dials being graduated, with a vernier scale for reading to fractions of a dial division. This figure also shows, diagrammatically, the incandescent lamps for illuminating the interior of the diffusing or equalizing chamber, with removable filters for restricting the admitted light to one or another selected part of the spectrum, according to the particular filters used.

Fig. 5 is a detail section on the same plane as Fig. 2 but on a larger scale, illustrating one of the shutters in fully open position.

Fig. 6 is a section on line 6—6 of Fig. 5.

Fig. 7 is a diagrammatic development of the shutter blades in one plane, showing the blades in fully closed position.

Figure 1:
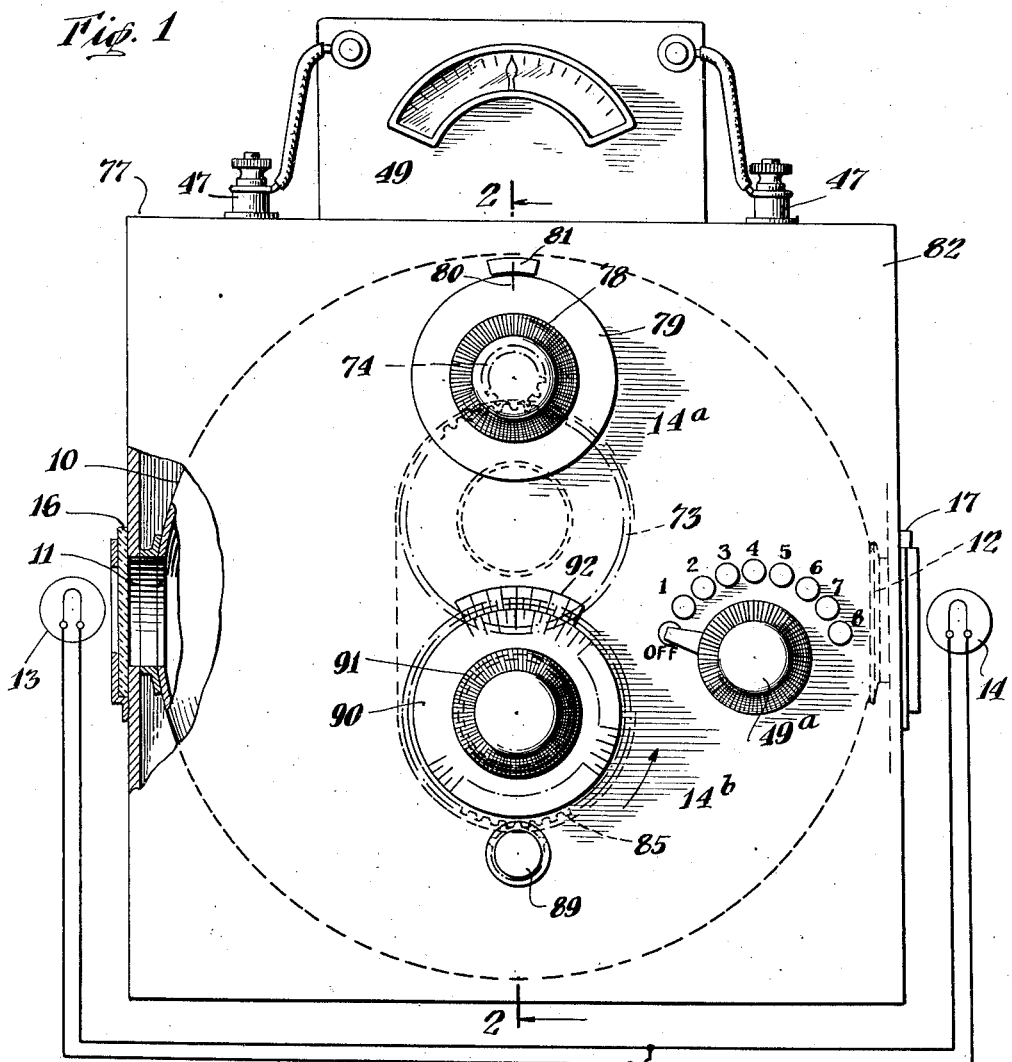
Figure 2:
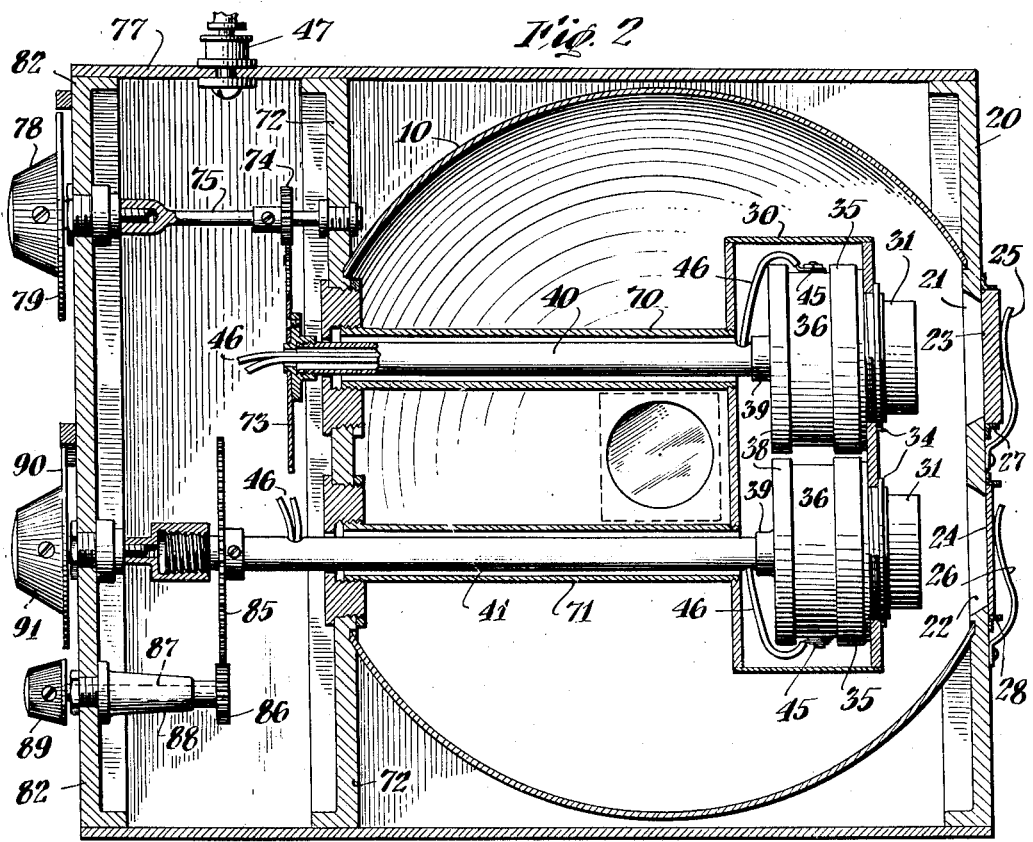
Fig. 2 is a section on line 2—2 of Fig. 1.

The light-equalizing chamber 10, Figs. 1 and 2, preferably spherical in form, is provided with diametrically opposite windows 11, 12, for illumination of the interior of the chamber by means of suitable light sources, preferably incandescent electric lamps, as indicated at 13, 14, connected in parallel for connection with the ordinary house wiring by means of a plug 15. Removable light filters, as 16, 17, may be interposed between the lamps and the windows to confine the illumination to a desired part of the spectrum. Filters made wholly of glass are desirable for the purpose. The lamps may be provided with reflectors and can be supported in position by any convenient and suitable means, not shown.

Figure 4:
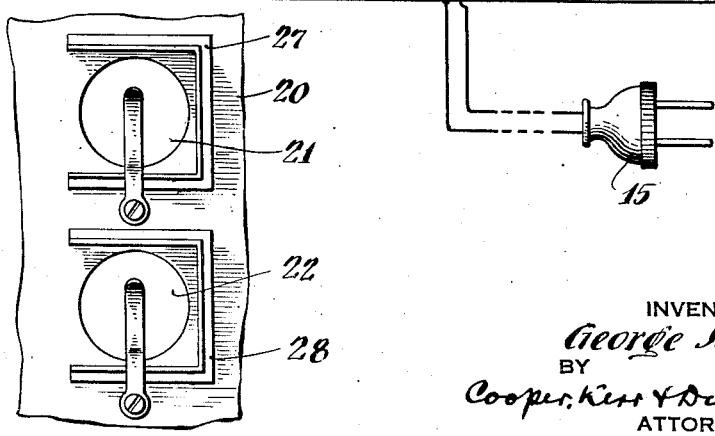
Fig. 4 is a fragmentary rear view showing the openings through which the surfaces to be examined are exposed to the interior of the equalizing chamber, with the means for holding such surfaces in place.

At the back of the equalizing chamber 10 a plate 20, Figs. 2 and 4, is provided, having circular exposure openings 21, 22, for the light-reflecting specimens indicated at 23, 24, Fig. 2, held in place by springs 25, 26. Ribs 27, 28 may be provided to position the specimens properly with respect to the openings.

Inside of the light-equalizing chamber 10, Fig. 2, is a casing 30 facing the exposure openings 21, 22 and having two openings axially aligned with the latter, equipped with tubular shields 31 (see Fig. 5) to prevent light reflected by either surface 23, 24, from entering the other opening. These shields and the casing are coated outside with the light-diffusing white material used on the inside of the chamber, but the shields are matte black on the inside to absorb incident light. Each shield is mounted in a threaded neck 32, Fig. 5, extending through the casing wall from an annulus 33 which is held firmly on the wall of the casing 30 by a threaded locking ring 34. The annulus is also threaded, to take a union 35 by which the cell box 36, containing the light-sensitive cell $C_2$, is held in place. The bottom 36a of the cell box is tapered and the annulus 33 is correspondingly coned so that the box and cell will be accurately centered with respect to the respective exposure opening (21 or 22 as the case may be) when the parts are assembled, but the pressure of the two tapers on each other is such that the box can rotate smoothly and easily for the purpose explained below. This capability of rotation of the cell-box and cell is not essential, but it simplifies the construction considerably. The back of the cell box is formed by a threaded cap 38 provided with a threaded neck 39 to afford connection with the tubular shutter-adjusting shaft 40 or 41 as the case may be (see Fig. 2).

Figure 3:
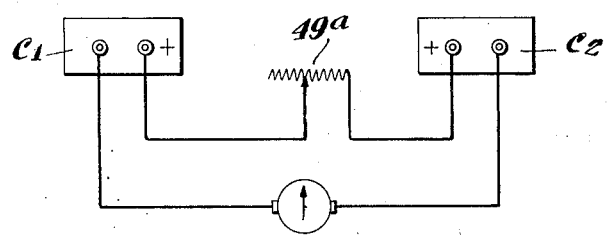
Fig. 3 is a diagram showing the electrical connections of the two light-sensitive cells to the galvanometer.

The preferred light-sensitive cells are preferably of the barrier layer type, equipped with binding post terminals, close together, one of which is shown at 45, Figs. 2 and 5. Leads 46 are brought out from these terminals through the shafts 40, 41 and are connected as indicated in Fig. 3, like poles being connected together and the others to the binding posts 47 on the housing 11, Figs. 1 and 2, by which connection can be made with the galvanometer 49. It will thus be seen that the potentials generated by the light impinging on the light-sensitive surfaces of the cells are in opposition, and hence no current flows through the galvanometer if the two potentials are equal, which means that the two cells are receiving equal amounts of light energy. The galvanometer circuit may have a switch and variable resistance, as 49a, Figs. 1 and 3.

Instead of shutters adjustable by inward and outward movement of their blades, as for example a shutter of the iris diaphragm type, or one having an adjustable slit transverse to the cell surface, I prefer a shutter having sectors revoluble about the axis of the exposure opening and light-sensitive cell, as I have found that such a shutter is not only more convenient in use but also gives accurate results over a wider range of shutter opening. It also gives a linear relation between the angular movement of the shutter adjusting dial and the varying cross-sectional area of the reflected beam.

In general the shutter may have any number of movable sector blades, but I have found that satisfactory results can be obtained with one fixed blade and three movable blades, as in Figs. 5, 6 and 7. In the construction illustrated the fixed blade, 50, slightly more than 90° in angular extent, is carried by the annulus 33, which is clamped immovably to the casing wall 30 by the locking ring 34 as previously explained. Between the fixed blade and the light-sensitive cell are three movable sector blades 51, 52, 53, each slightly more than 90° in width, blades 51 and 52 being carried by rotatable rings 54, 55, respectively, which are mounted in a recess in the annulus 36a forming the bottom of the cell box 36, blade 53 being carried by this annulus. In Figs. 5 and 6 the shutter is shown fully open, movable blades 51, 52, 53 being in register with each other and with fixed blade 50. The diagrammatic view, Fig. 7, shows the shutter parts separated and arranged in the same plane one below the other but in the relative angular positions which they occupy when the shutter is fully closed. The observer is supposed to be looking into the open end of the screen tube 31 of Fig. 5. All shutter parts on which light may impinge are matte black in color.

To open the shutter—that is, to move the blades 53, 52, 51, Fig. 7, into register with blade 50—annulus 36a (shutter part A in Fig. 7) is turned clockwise by shaft 40, and as blade 53 comes into register with blade 52, pin 56, extending toward the observer from blade 53, enters recess 57 in blade 52 and picks up the latter. The two blades now in register move together into register with blade 51. As this condition is attained pin 56 enters recess 58 in blade 51 and picks up the latter blade. The three, now in register with each other, move on together and as they come into register with fixed blade 50 the ends of recesses 59 and 60 in blades 51 and 52 meet detent pin 61 which extends from the rear face of fixed blade 50 through the plane of blade 51 and into the plane of blade 52 but not beyond. The pin thus arrests the movable blades with all three under and in register with the fixed blade. In the operation described, blade 53 moves clockwise 270°, blade 52 in the same direction 180°, and blade 51 also in the same direction 90°. For the sake of clearness the blades are shown unnecessarily thick in Fig. 5. Thin blades are desirable but they should be made of hard material and thick enough to prevent careless manipulation from injuring the pins or the blade edges cooperating therewith.

Remembering that in the full open position the blades are in register one behind the other as described above, the closing operation will be readily understood. In this operation shutter part A (Fig. 7) is turned counterclockwise, thus moving blade 53 out from under blade 52, which remains in register with the other two. As blade 53 nears the end of a 90° movement, pin 56 meets lug 62 on part B, which, it is to be remembered, had been rotated 180° clockwise and had thereby brought the lug to a position diametrically opposite that shown in Fig. 7. Part B having thus been picked up, blade 52 is carried along with blade 53 but trails behind it. As blade 53 nears the end of another 90° movement counterclockwise (blade 52 moving 90° at the same time) pin 56 meets lug 63 on part C, which, it is to be remembered, had been turned 90° in the opening operation described above, thereby bringing the lug 63 to a position 90° clockwise from that shown in Fig. 7. Blade 51, trailing behind blade 52, then moves on with pin 56 until blade 53 completes another 90° movement (270° in all), at which point the movable blades are arrested by the lugs 62 and 63 meeting detent pin 61 on the fixed blade 50. The blades are then in the relative positions indicated in Fig. 7, blades 53, 52 and 51 having turned 270°, 180°, and 90°, respectively.

The housing 30 is carried by the ends of two tubular supports 70, 71, Fig. 2, fixed at their other ends to the plate 72, shafts 40, 41 extending through these supports and through plate 72 also. Preferably the two shafts are equipped with slow motion mechanisms, for fine adjustment of the shutters. Thus shaft 40 is rotated by a gear 73 meshing with a pinion 74 on a shaft 75 mounted in plate 72 and the casing front 82 of housing 77 and itself rotated by a knob 78 on dial 79. The latter has a mark 80 (see Fig. 1) registering with index 81 on the casing front 82 when the shutter operated by shaft 40 is fully open. Shaft 41 is rotated by a gear 85 meshing with a pinion 86 on a shaft 87 mounted in a bearing 88 carried by the casing front 82. Shaft 87 is rotated by a knob 89, and shaft 41 is connected to a coaxial dial 90, so that as the shaft is rotated by pinion 86 and gear 85 the dial 90 will be turned through an equal angle. Dial 90 has a knob 91 for quick adjustment of the shaft. This dial is graduated in equal divisions over 270° of its periphery as shown in Fig. 1, corresponding to the 270° opening of the fully open shutter. Preferably one hundred divisions are provided, so that the readings can be in percentages. A vernier scale 92 is provided for reading to fractions of a division. The position of the dial relative to the shutter is such that when the shutter is fully open the 100 mark on the dial registers with the mark at the left end of the vernier.

The preferred method of operating the instrument for measuring the reflectivity of a surface is as follows.

Two standard surfaces, previously matched and known to have a definite reflecting power— for example 95, which means that they reflect 95 per cent of the total amount of light (of a given wave-length range) that can be reflected from, say, fresh magnesium oxide, which may be taken as 100—are placed at the exposure openings, and dial 90 is set at scale-reading 95. Dial 79 is now adjusted, until the galvanometer reads zero. The instrument is then in balance with reference to the standard used, in the present instance 95. The standard exposed at opening 21 (and thus exposed to cell $C_1$, Fig. 3) is now removed and the specimen to be measured is put in its place. If the galvanometer reading is then zero the specimen has the same reflectivity as the standard. But suppose the needle swings in the direction (say to the left in Fig. 1) indicating that the specimen has greater reflecting power than the standard. In such case the dial 90 is turned (opening farther the shutter controlling cell $C_2$) until the galvanometer again comes to zero. The reflectivity of the specimen can then be read directly from dial 90 as a percentage of the reflecting power of magnesium oxide. If the needle swings toward the right, indicating that the surface to be measured has less reflecting power than the standard, the dial 90 is adjusted to decrease the shutter opening and thereby bring the needle again to zero.

The instrument can also be used in various ways to measure the intensity of the light emitted by one source, say an incandescent lamp, in comparison with another lamp. For example, one of the filters, say 16, is replaced by an opaque slide and both shutters are closed. The lamp which is to serve as the standard is then placed in front of the other opening, 12. The lower shutter (controlling cell $C_2$, Fig. 3) is then opened until the galvanometer needle is deflected to a convenient point on its scale, and the galvanometer and shutter readings are noted. If necessary the rheostat 49a can be adjusted to keep the needle on the scale, or a piece of glass of "neutral" tint can be substituted for the filter 17 or interposed between the latter and the lamp. The "standard" lamp is then replaced with the lamp which is to be compared with it, and the shutter is adjusted to bring the needle to the noted point on the galvanometer. The inverse ratio of the two dial readings can then be taken as a measure of the intensity of the second light-source in terms of the first. In making such measurements the reflecting surface 24 is preferably specular, for example silver on glass, so that the determinations will be independent of the color of the surface. In another method of comparing or measuring intensities the windows 11, 12 are both closed and the lower cell is exposed directly to the two light sources by arranging them, one after the other, at the lower exposure opening 22, which latter may be covered by a piece of glass of suitable color and transparency in place of the reflecting surface 24. To avoid casting a shadow on the light-sensitive cell the spring 26 can be swung to one side.

It is to be understood that the invention is not confined to the construction herein specifically described but can be embodied in other forms without departing from its spirit as defined by the appended claims.

I claim:

1. In an apparatus for the purpose described, in combination, a spherically shaped light-equalizing chamber having a pair of openings adapted to be closed by a pair of specimens for optical examination, windows symmetrically placed in the wall of said chamber through which the interior of said chamber may be illuminated from the outside, a pair of light sensitive cells inside of the chamber and individual to said specimens to receive beams of light reflected therefrom, said cells being positioned forward of said windows to prevent their direct illumination from the windows, tubular elements extending within said chamber for supporting said pair of light sensitive cells, electrically actuated means connected for indicating equality and departure from equality of the electrical effects produced by such light beams, independently adjustable shutters interposed between the cells and the respective specimens to vary the cross-sectional areas of the light beams, rotatable shafts connected with the shutters to adjust the same, said shafts being mounted within said tubular supporting elements and extending outside of said chamber for manual actuation, and a graduated dial connected with one of said shafts for angular rotation in unison with the shutter as the same is adjusted by its shaft.

2. In an apparatus for the purpose described, in combination, a light-equalizing chamber having a light-diffusing inner surface and a pair of openings adapted to be closed by a pair of specimens for optical examination, said openings being in relatively close proximity, a pair of windows in the wall of said chamber through which the interior of said chamber may be illuminated from the outside of said chamber, said windows being mounted in rounded portions of the wall of said chamber and symmetrically placed with respect to said specimens, a pair of light sensitive cells inside of the chamber and individual to said specimens to receive beams of light reflected therefrom, means extending within said chamber for supporting said cells in positions opposite said specimens and out of direct illumination from said windows, shields for shielding each individual cell from practically all light except the beams of light reflected from its associated specimen, electrically actuated means connected for indicating equality and departure from equality of the electrical effects produced by such light beams upon the respective cells, independently adjustable shutters interposed between the cells and the respective specimens to vary the cross-sectional areas of the light beams, and manually operative means connected with the shutters to adjust the same.

3. In an apparatus for the purpose described, in combination, a spherically shaped light-equalizing chamber having a light-diffusing inner surface and a pair of openings adapted to be closed by a pair of specimens for optical examination, windows in the wall of said chamber through which the interior of said chamber may be illuminated from the outside of said chamber, a pair of light sensitive cells inside of the chamber and individual to said specimens to receive beams of light reflected therefrom, means extending within said chamber for supporting said cells in positions opposite said specimens and out of direct illumination from said windows, shields carried by said supporting means for shielding each individual cell from practically all light except the beams of light reflected from its associated specimen, electrically actuated means connected for indicating equality and departure from equality of the electrical effects produced by such light beams upon the respective cells, independently adjustable shutters interposed between the cells and the respective specimens to vary the cross-sectional areas of the light beams, said shutters being supported by said cell-supporting means, means connected with the shutters to adjust the same, and indicating means by which the relative adjusted positions of the shutters may be determined.

4. In an apparatus for the purpose described, in combination, a container, a spherically shaped light-equalizing chamber within said container, said chamber having a light-diffusing inner surface, a pair of openings in the wall of said chamber, means for holding test specimens against said pair of openings, oppositely facing windows in the wall of said chamber through which the interior of said chamber may be illuminated, a pair of light sensitive cells individual to said specimens to receive beams of light reflected therefrom, means supporting said light sensitive cells opposite to said pair of openings, said means including tubular elements supported in the wall of said chamber and extending therein for supporting said light sensitive cells opposite the openings in said wall, independently adjustable shutters having rotatable sector plates interposed between the cells and the respective specimens to vary the cross-sectional areas of the light beams, said adjustable shutters comprising plate sectors rotatable for opening and closing the shutters, means for adjusting said shutters by rotation of the light sensitive cells, rotatable shafts within said tubular elements, said rotatable shafts being attached to said light sensitive cells whereby the rotary positions of the cells may be changed, and means for rotating said tubular shafts and light sensitive cells to adjust the shutters for varying the cross-sectional areas of the light beams passing from said specimens to said light sensitive cells.

GEORGE J. LANE.